(12) United States Patent
Carroll

(10) Patent No.: US 12,546,579 B2
(45) Date of Patent: Feb. 10, 2026

(54) ADJUSTABLE WHEEL CLAMP ASSEMBLY

(71) Applicant: Hunter Engineering Company, Bridgeton, MO (US)

(72) Inventor: Craig A. Carroll, O'Fallon, MO (US)

(73) Assignee: Hunter Engineering Company, St. Louis, MO (US)

(*) Notice: Subject to any disclaimer, the term of this patent is extended or adjusted under 35 U.S.C. 154(b) by 229 days.

(21) Appl. No.: 18/486,893

(22) Filed: Oct. 13, 2023

(65) Prior Publication Data

US 2024/0133668 A1 Apr. 25, 2024
US 2024/0230306 A9 Jul. 11, 2024

Related U.S. Application Data

(60) Provisional application No. 63/418,303, filed on Oct. 21, 2022.

(51) Int. Cl.
*G01B 5/00* (2006.01)

(52) U.S. Cl.
CPC .................. *G01B 5/0004* (2013.01)

(58) Field of Classification Search
CPC ..... G01B 5/0004; G01B 5/255; G01B 11/275
See application file for complete search history.

(56) References Cited

U.S. PATENT DOCUMENTS

| | | | | |
|---|---|---|---|---|
| 2,972,189 A * | 2/1961 | Holub | ................... | G01M 17/06 33/DIG. 1 |
| 4,377,038 A * | 3/1983 | Ragan | ................... | G01B 21/26 33/336 |
| 4,444,496 A * | 4/1984 | Dale, Jr. | ............... | G01B 11/275 33/228 |
| 4,918,821 A * | 4/1990 | Bjork | ................... | G01B 11/275 33/203.18 |
| 6,131,293 A * | 10/2000 | Maioli | ................... | G01B 5/255 33/203.18 |
| 6,226,879 B1 * | 5/2001 | Baird | ................... | G01B 11/275 33/286 |
| 7,093,369 B2 * | 8/2006 | Ohnesorge | ............. | G01B 5/255 33/336 |

(Continued)

FOREIGN PATENT DOCUMENTS

| | | | |
|---|---|---|---|
| WO | 2021228564 A1 | 11/2021 | |
| WO | 2023185238 A1 | 10/2023 | |

*Primary Examiner* — Eret C Mcnichols
(74) *Attorney, Agent, or Firm* — Sandberg Phoenix & von Gontard, PC

(57) ABSTRACT

A wheel adaptor for placement against a rim edge of a wheel having a recessed central hub. The adaptor comprises a base supporting, on an inboard side, a framework for synchronous radial adjustment of at least three contact surfaces. An axially adjustable target mount is secured to the base on an outboard side. A spring-biased clamp is coupled to the base, positioned axially inboard of the target mount. Extending radially outward from the clamp, a pair of wheel clamp arms are adjustably configured to engage the tread surface of a tire when placed against the wheel. Engagement of the clamp applies a grips the tire tread surface, holding the contact surfaces against the wheel. A radially outward position of the contact surfaces along the base is controlled by a rotating selection element and a set of linkages coupling each contract surface to the selection element.

17 Claims, 10 Drawing Sheets

(56) References Cited

U.S. PATENT DOCUMENTS

| | | | |
|---|---|---|---|
| 7,703,212 B2* | 4/2010 | Stieff | G01B 11/2755 |
| | | | 33/203.18 |
| 8,104,185 B2* | 1/2012 | Gray | G01B 5/255 |
| | | | 33/203.18 |
| 9,134,125 B2* | 9/2015 | Gray | G01B 21/26 |
| 9,228,819 B2 | 1/2016 | Pruitt et al. | |
| 9,297,648 B2* | 3/2016 | Kroll | G01B 11/275 |
| 10,203,205 B2 | 2/2019 | Ferrari et al. | |
| 10,252,682 B2* | 4/2019 | Linson | B60R 11/00 |
| 11,009,335 B2 | 5/2021 | Kambhaluru et al. | |
| 12,038,127 B1* | 7/2024 | Ashe | F16M 13/02 |
| 12,090,784 B2* | 9/2024 | Hofmann | G01B 5/255 |
| 12,269,293 B2* | 4/2025 | Hofmann | B60B 30/00 |
| 2016/0334209 A1* | 11/2016 | Linson | G01B 5/255 |
| 2021/0317947 A1 | 10/2021 | Peters et al. | |
| 2022/0212497 A1 | 7/2022 | Hofmann et al. | |
| 2022/0242168 A1 | 8/2022 | Hofmann et al. | |
| 2022/0396093 A1 | 12/2022 | Corghi | |

* cited by examiner

ADJUSTABLE WHEEL CLAMP ASSEMBLY

CROSS-REFERENCE TO RELATED APPLICATIONS

The present application is related to and claims priority from U.S. Provisional Patent Application Ser. No. 63/418,303 filed on Oct. 21, 2022, which is herein incorporated by reference.

STATEMENT REGARDING FEDERALLY SPONSORED RESEARCH

Not Applicable.

BACKGROUND OF THE INVENTION

The present invention relates to vehicle measurement and inspection systems, and in particular to an adaptor configured for securing an optical target relative to a large diameter vehicle wheel assembly, such as a heavy-duty truck wheel assembly, during a vehicle wheel alignment measurement or inspection procedure.

An optical vehicle wheel alignment measurement or inspection system generally includes a computer or processing unit, a number of optical sensors or cameras for providing data to the computer or processing unit, one or more display devices such as a monitor, and at least one input device such as a keyboard. The computer or processing unit is configured with software applications, at least one of which is adapted to facilitate the measurement or inspection of alignment angles associated with one or more vehicle wheel assemblies on a vehicle. The software application configures the processing unit to utilize input data received from the optical sensors or cameras after images of optical targets secured to the vehicle wheel assemblies are captured. The spatial orientation of each wheel mounted optical target in the captured images is representative of a spatial orientation of the corresponding wheel assembly and associated alignment measurements.

Unlike the wheel assemblies used with passenger vehicles, wheel assemblies found on heavy duty trucks often incorporate large diameter rims adapted for reversible mounting in a dual wheel configuration. These rims are designed with highly convex surfaces to facilitate reversible attachment to a wheel hub assembly to position a tire in either an inner or an outer position of the dual wheel arrangement. Typically, the rims are mounted with the convex surfaces projecting outward on single-wheel or steerable axles, such as found at the front of the vehicles, while the rims are mounted in the reverse configuration in the outermost position in a dual wheel configuration on a rear axle. A variety of different placement configurations for individual wheel assemblies about a vehicle are possible, depending upon the number and type of axles present.

Traditionally, an optical target is temporarily affixed to a vehicle wheel assembly utilizing a precision rim-clamping wheel adaptor configured to engage either a rim hub bore edge or a rim circumferential outer edge. Once secured, the wheel adaptor establishes a mounting point for an optical target in a position which is substantially coaxial with an axis of rotation for the wheel assembly. Traditional rim-clamping wheel adaptors include a set of claws or feet adapted to secure the wheel adaptor to the wheel assembly by engaging the hub bore or rim edge. An adjustable centering mechanism on the wheel adaptor ensures that the claws or feet of the wheel adaptor adjust to accommodate differing rim diameters in a symmetrical manner to maintain the mounting point for the optical target in a determined position relative to the axial center of the engaged rim surface.

When configured for use with large diameter highly convex (or concave) vehicle wheel assemblies, such as found on heavy duty trucks or vehicles with dually rear axles, traditional rim-clamping adaptors must include sufficient structure to provide clearance around the axially outward projecting structure of the wheel assembly hub. As a result, traditional adapters often become large, heavy, and awkward to use with heavy duty vehicles. Furthermore, due to higher inflation pressures often used in the large diameter wheel assemblies of heavy-duty vehicles, engaging the claws or feet of a traditional adaptor with the interface between the tire and wheel rim edge of the wheel assembly becomes difficult. Overall, the process of attaching a traditional adaptor to a large diameter wheel on a heavy-duty vehicle with either a raised or recessed central hub surface is time consuming and prone to errors resulting from poor surface engagements.

Light-weight adaptor assemblies with optical targets have been developed for use when acquiring measurements from the wheel assemblies on passenger car and light truck wheels. These light-weight adaptor assemblies, such as shown in U.S. Pat. No. 8,341,848 B2 to Stieff et al. are designed to be placed against an outboard surface of a relatively flat-faced wheel rim, in a non-determined position over the wheel axis of rotation. A pair of wheel clamp arms engage the tread surfaces of the tire to retain the adaptor in place while measurements are acquired from a multi-surface optical target disposed on an outboard end of the adaptor. To minimize the weight and clamping force required to keep the light-weight adaptor secured to the vehicle wheel assembly during use, the structure of the adaptor is designed to carry the optical target as close to the vehicle wheel assembly outboard surface as possible. This structural design renders it difficult or impossible to utilize the light-weight passenger vehicle adaptor assemblies on a vehicle wheel assembly having a prominently raised central hub surface without the use of extension components to provide clearance of the central hub. Similarly, the light-weight passenger vehicle adaptor assembly is difficult to utilize on a vehicle wheel assembly having a deeply recessed central hub surface due to a lack of outboard planar surfaces of the wheel rim onto which the adaptor base can be positioned in a stable manner.

A solution for securing a wheel adaptor assembly to large diameter vehicle wheel assemblies having deeply recessed central hub surfaces is seen in U.S. Pat. No. 10,252,682 B2 to Linson, herein incorporated by reference, wherein a light-weight adapter utilizing tire griping arms in combination with a fixed set of angled mounting feet engaging a wheel rim surface is shown. The adapter of the '682 Linson patent can be utilized with large diameter vehicle wheel assemblies of a few predetermined sizes, provided that the angled mounting feet can engage the wheel rim surfaces. Wheel assemblies having diameters outside of the range accepted by the fixed angled mounting feet cannot be easily accommodated.

Improved optical vehicle wheel alignment measurement or inspection systems can be configured to acquire measurements from heavy duty vehicles having more than two axles. However, when the optical sensors or cameras, typically located near the front of the vehicle service area, are utilized to observe optical targets mounted to the wheels on closely spaced rear tandem axles of such a vehicle or an attached trailer, lines of sight can become blocked by wheel-mounted optical targets located in close proximity to each other.

Accordingly, it would be advantageous to provide an adjustable light-weight adaptor assembly suitable for securing optical targets to a range of large diameter vehicle wheels on a heavy duty vehicle having deeply recessed central hub surfaces, and which enables an operator to selectively adjust at least a lateral spacing of the optical target from an outermost surface of the wheel in order to overcome line-of-sight issues caused by optical targets mounted to adjacent wheels.

BRIEF SUMMARY OF THE INVENTION

In one embodiment, a target supporting wheel adaptor assembly is configured for placement against a wheel assembly. The adaptor assembly comprises a base assembly supporting, on an inboard side facing the wheel assembly, a framework for synchronous radial adjustment of a linked set of at least three wheel-engaging contact members. The radially outward position of the contact members along the base assembly is arranged for fitment to an outboard surface of the wheel assembly and is adjusted by a rotating position selector and a set of connecting linkages. An axially adjustable target mount is secured to the base assembly on an outboard side opposite the wheel assembly to receive an optical target or other instrumentation. A spring-biased clamp assembly is secured to the outboard side of the base assembly, axially inboard of the target mount. A pair of wheel clamp arms extend laterally from the clamp assembly and are adjustably configured to engage the tread surface of a tire while the contact members are engaged with the wheel assembly. Compression of the spring-biased clamp assembly applies a clamping load to the tire tread surface through the wheel clamp arms, holding the contact members against the wheel assembly.

In a further embodiment of the present disclosure, the axially adjustable target mount comprises a fixed rail projecting perpendicular to the outboard side of the base assembly, and a target coupling having a bore for receiving a shaft of the optical target. The target coupling is engaged with the fixed rail for sliding movement between axially outward retracted and extended positions and includes a plurality of marking indicia denoting predetermined rotational positions about the bore.

In a further embodiment of the present disclosure, each contact member comprises a removable support body extending inboard perpendicular to an associated support arm. Each support body is coupled to a base plate at a first end and has a contoured wheel contact surface at a second end axially opposite the first end. Sets of support bodies having different lengths can be interchanged to alter a standoff distance between the wheel adapter assembly and the wheel onto which it is to be secured. Each base plate is seated within a channel on the associated support arm for synchronous sliding movement radial to an axis of the base assembly, between inner and outer positions to accommodate wheel assemblies of different diameters. An axially disposed position selector is coupled to each base plate via an associated radially offset linkage, such that rotation of the position selector imparts synchronous linear motion to each base plate in the radial directions.

A method of the present invention for positioning an optical target or other instrumentation against a wheel assembly requires placing a wheel adaptor assembly against an outboard surface of the wheel assembly. The wheel adapter assembly supports the optical target or other instrumentation on an outboard side of a base assembly and provides at least three discrete contact surfaces adjustably located on an inboard side of the base assembly, a pair of wheel clamp arms with tire hooks, and a clamp assembly coupling the wheel clamp arms to the base assembly. A radial position of the contact surfaces is synchronously adjusted relative to an axis of the adaptor assembly to a diameter suited to engage a rim edge or concentric surface of the wheel assembly. Once adjusted, each contact surface is abutted against the rim edge or wheel assembly surface. The tire hooks are hooked to a tread surface of wheel assembly and the clamp assembly is engaged to apply a clamping force across the pair of wheel clamp arms, securing the wheel adaptor assembly against the wheel assembly.

In a further method of the present invention, the synchronous adjustment of each contact surface radial position is actuated by rotation of a central hub about a rotational axis. The central hub is rotated to a predetermined rotational position corresponding to a dimension of the wheel assembly onto which the adapter assembly. Rotation of the central hub imparts a radial movement to the contact surface relative to an axis of the adapter by altering a geometric relationship between each contact surface, the rotational axis, and an associated offset linkage coupling the contact surface to the central hub.

In a further method of the present invention, a position of the supported optical target on the wheel adapter assembly is altered along at least one axis parallel to an axis of the wheel adapter assembly in order to place the optical target within an unobstructed field of view for an observing imaging system. A receiving portion of the coupling securing the optical target to the base assembly of the adapter assembly is slid between a first position adjacent to the base assembly, and a second position displaced axially outward from the first position. Optionally, the optical target is rotated about the axis of the coupling to an operative orientation relative to the base.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
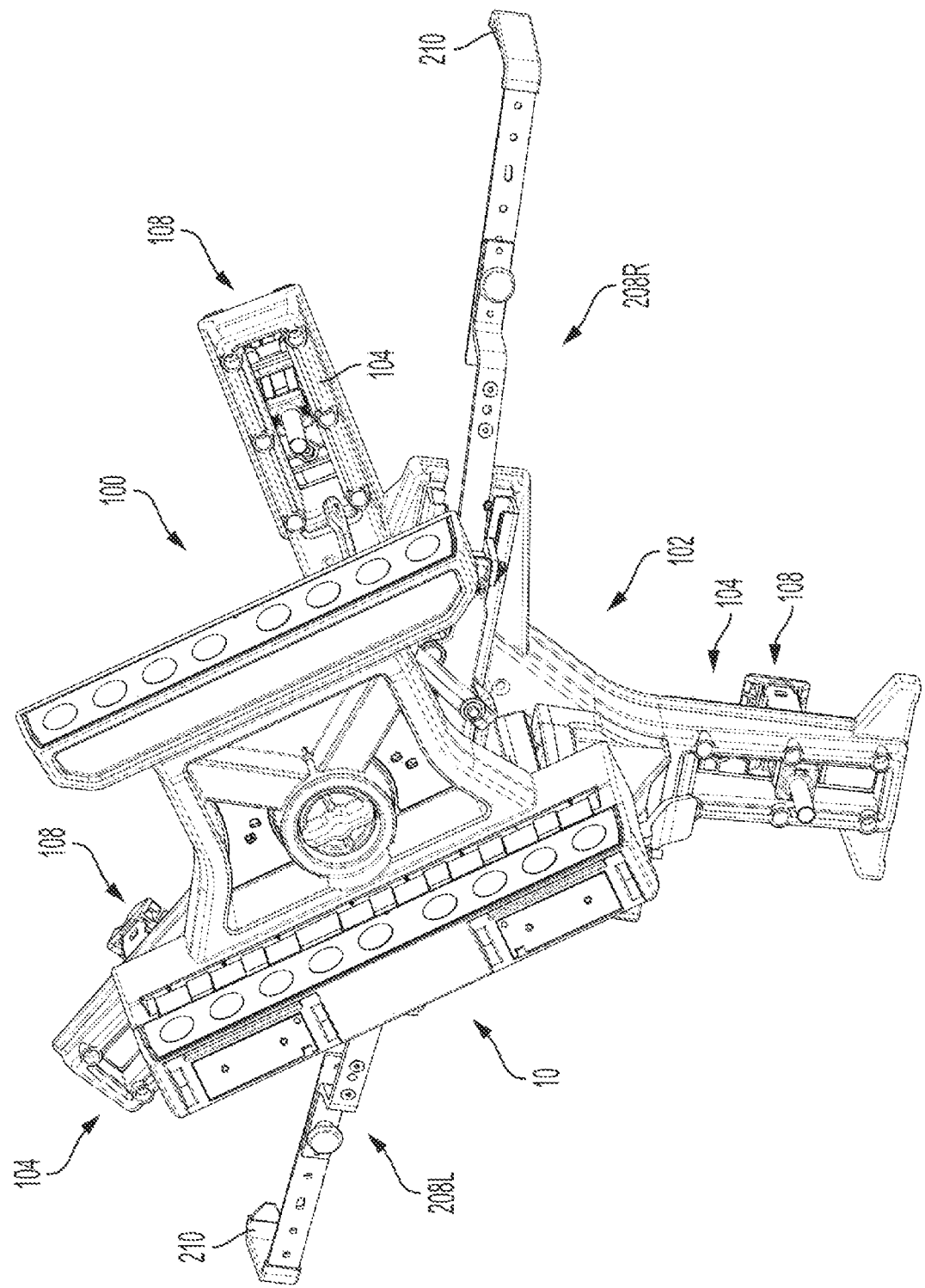
FIG. 1 is a front perspective view of a wheel adapter of the present disclosure supporting an optical target.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

In order to fully describe the apparatus and methods of the present disclosure, the following terms and definitions will be utilized in reference to a vehicle wheel assembly. The term "inboard surface" refers to the surface of an object, such as a vehicle wheel assembly, which is facing a centerline of the vehicle on which the wheel assembly is mounted. The term "inboard direction" refers to movement on or parallel to a wheel assembly axis of rotation. The terms "outboard surface" and "outboard direction" refer to the opposite surface and movement in the opposite direction from the inboard surface and inboard direction. Based on these definitions, it will be readily understood that an object can be described relative to a vehicle, as being "inboard" or "outboard" from another object or along an axis of rotation.

Figure 2:
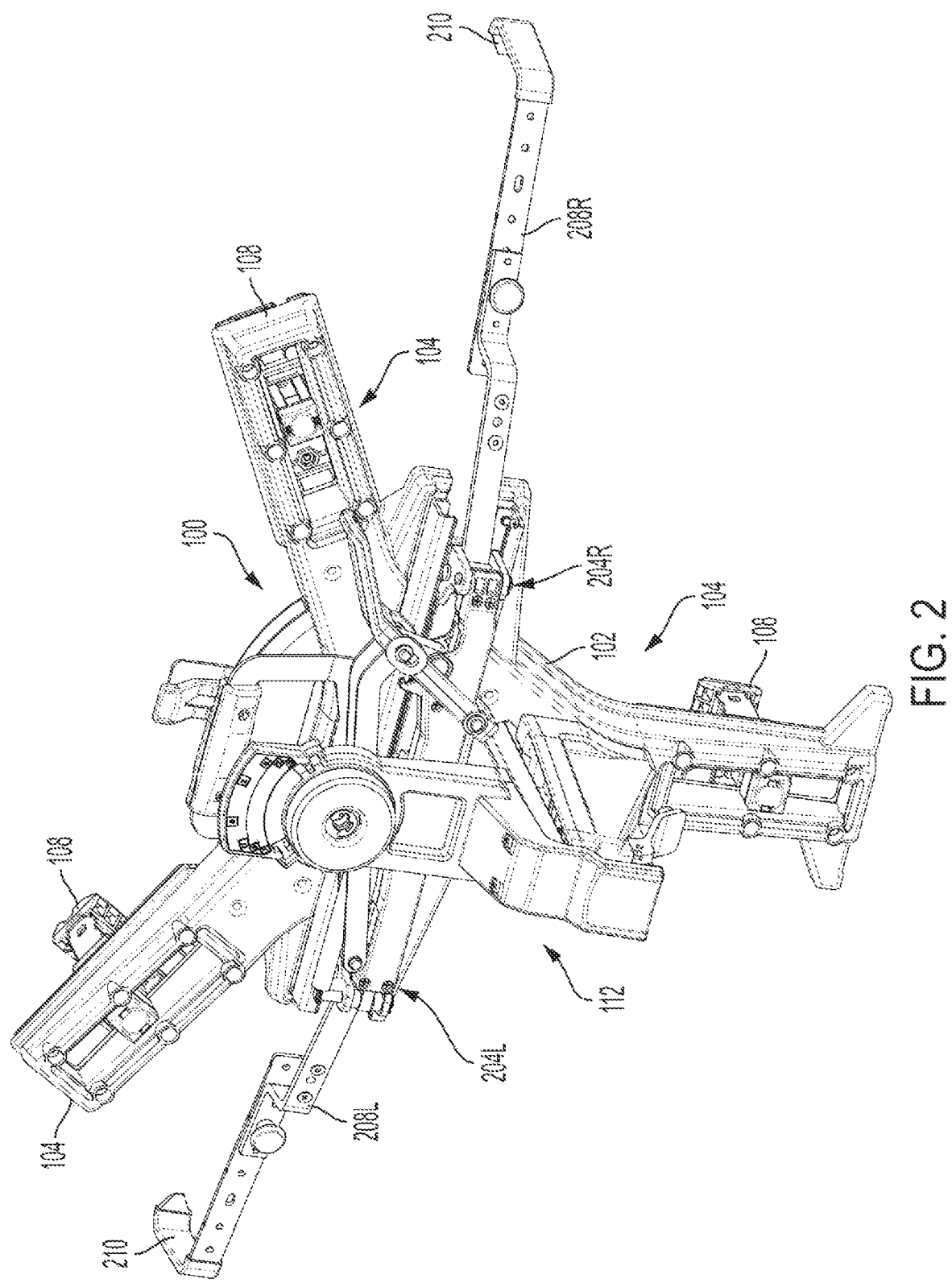
FIG. 2 is a front perspective view of the wheel adapter of FIG. 1, without the optical target.
Figure 3:
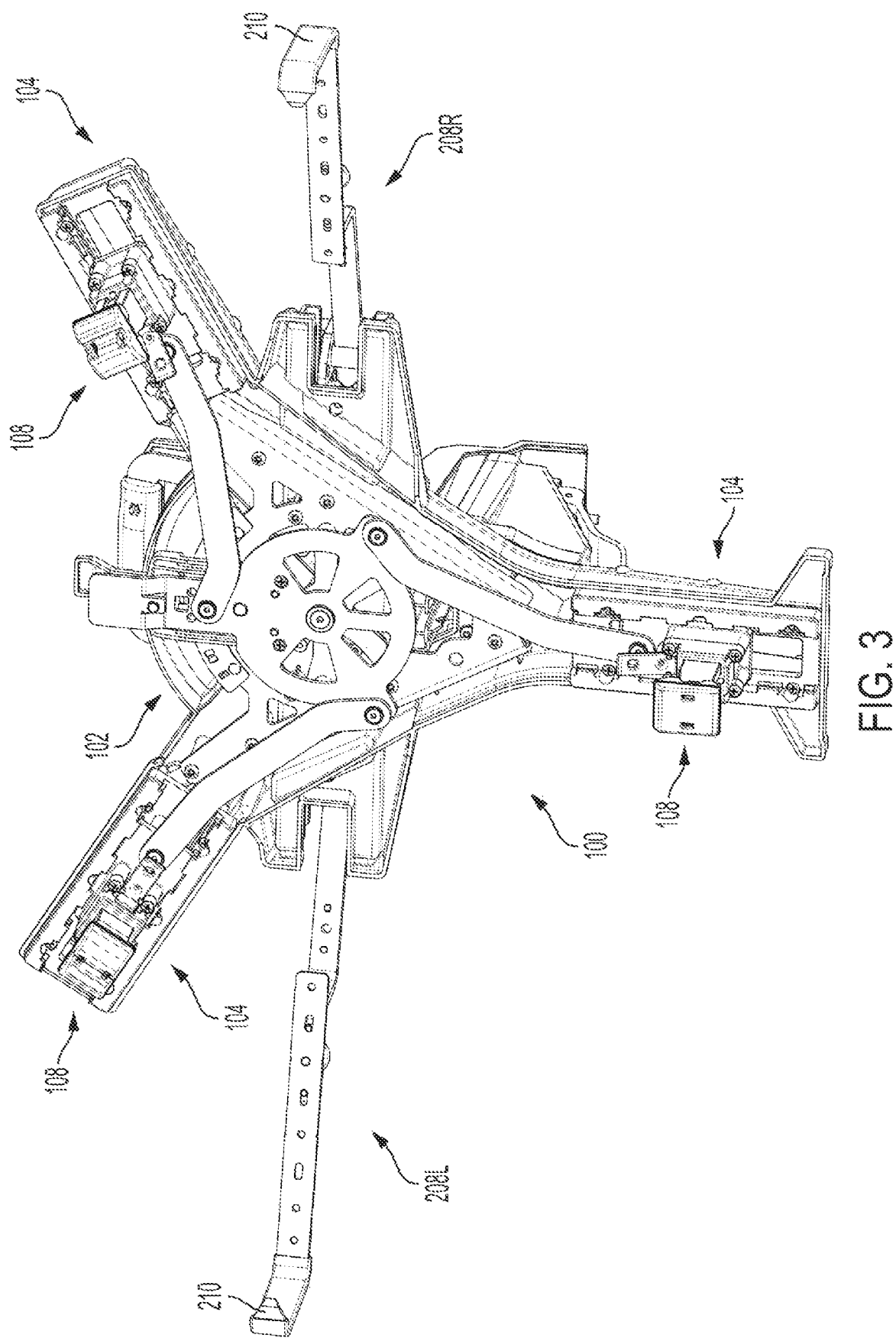
FIG. 3 is a rear perspective view of the wheel adapter of FIG. 2.
Figure 8:
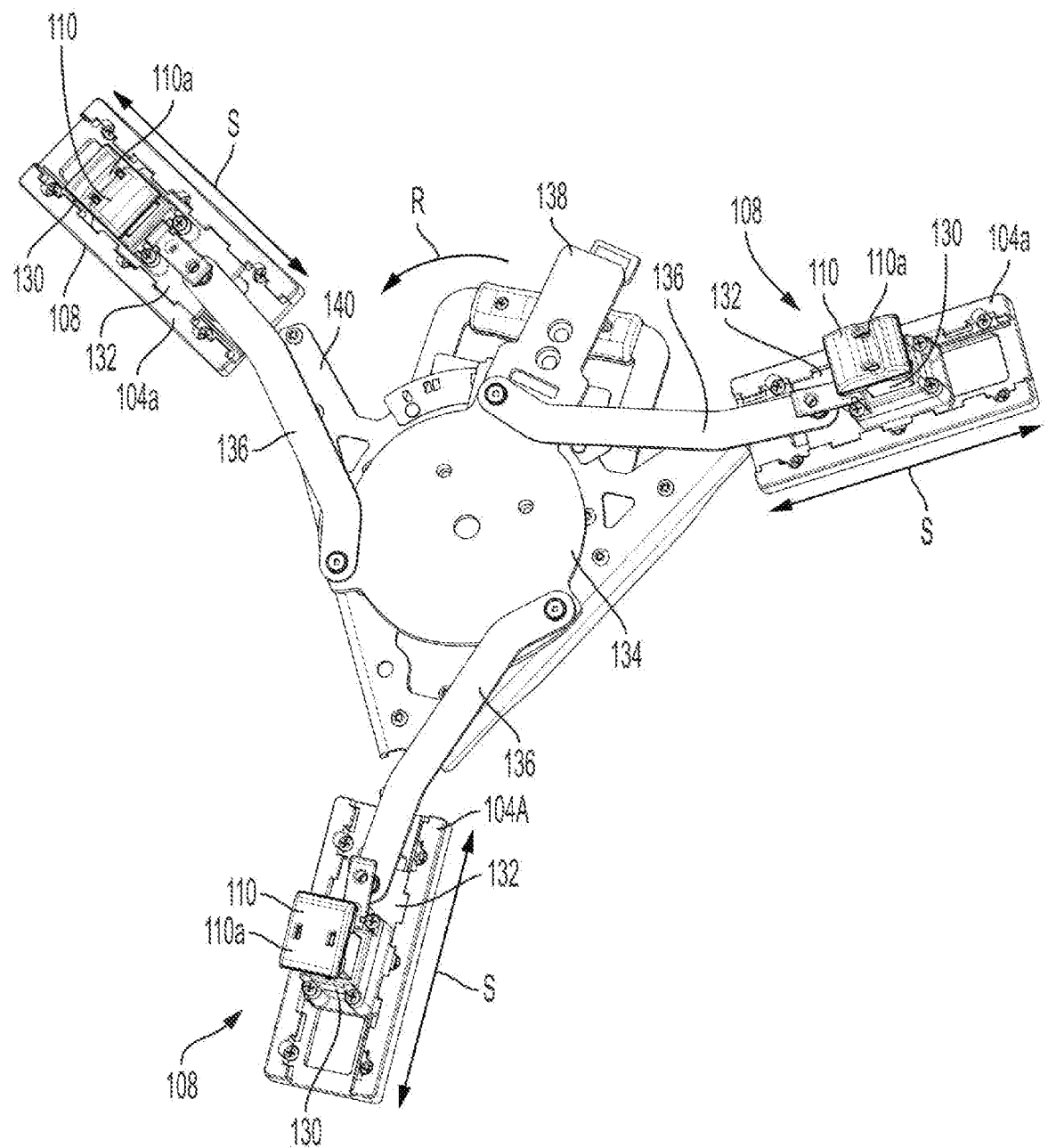
FIG. 8 is a rear perspective view of the support framework of FIG. 7.
Figure 9A:
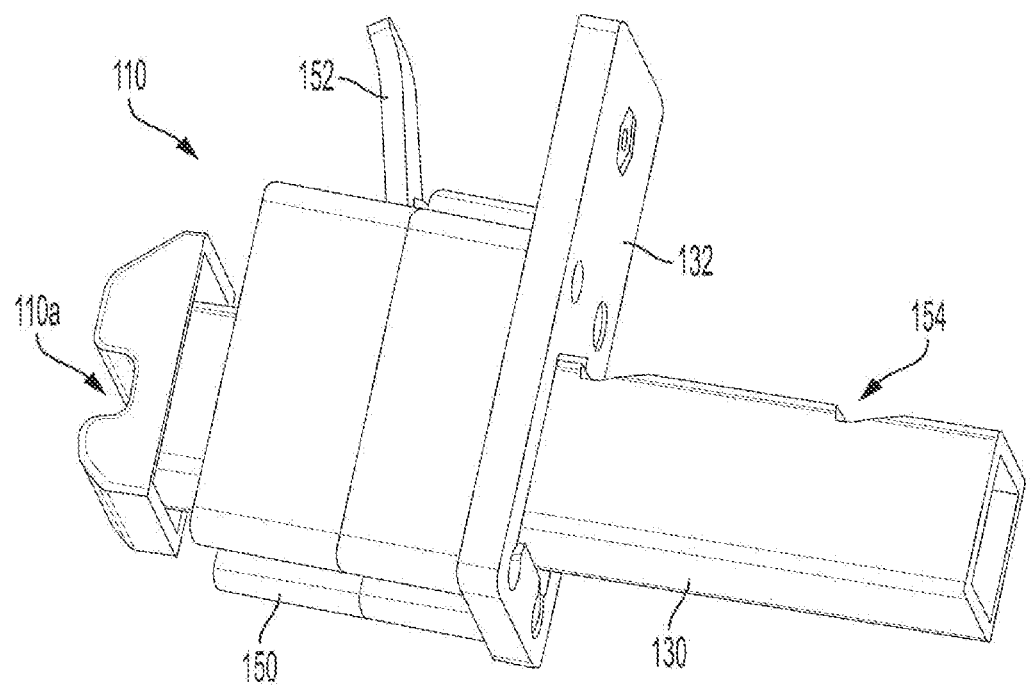
FIG. 9A is a perspective view of one contact surface and support body in a retracted position relative to a supporting base plate.
Figure 9B:
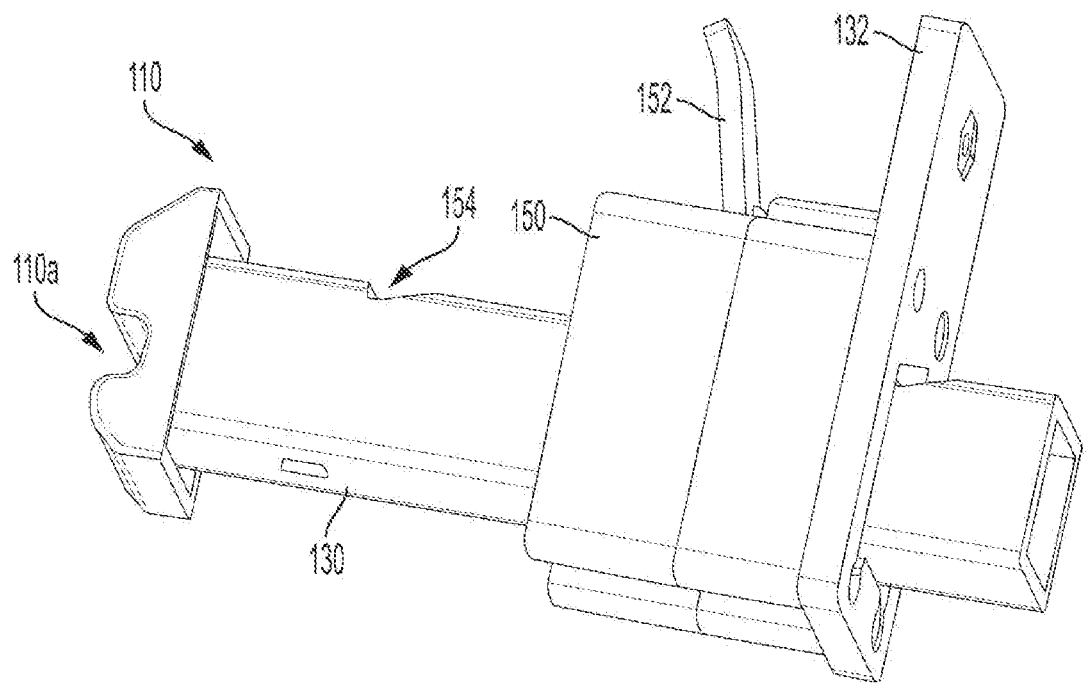
FIG. 9B is a perspective view of the contact surface and support body of FIG. 9A in an extended position relative to the supporting base plate.

Turning to the figures, and to FIGS. 1-4A in particular, an adaptor assembly of the present disclosure is shown generally at 100 in FIGS. 1-3. The adaptor assembly 100 is configured for abutting placement against an outboard surface of a wheel assembly rim (not shown). The adapter assembly 100 is particularly suitable for use on wheel assemblies having a large diameter rim, such as found on heavy-duty vehicles, and those with a recessed central hub. The adaptor assembly 100 comprises a base assembly 102 with at least three coplanar support arms 104 extending radially outward from a central body 106. The base assembly 102, support arms 104, and central body 106 may be formed together as an integrated unit seen in FIG. 4A or may be formed from rigidly connected sub-components. Each support arm 104 carries a contact member 108 for the abutting placement against an outboard surface of the wheel assembly rim. The support arms 104 are configured to locate the contact members 108 at a common circumference about an axis of the base assembly 102, providing a stable contact against the wheel assembly rim surface. As best seen in FIG. 8, each contact member 108 includes an inboard surface 110 configured for abutting engagement with the wheel assembly rim, and optionally may include at least one recessed portion 110a such as a step or notch, formed in the inboard surface for engaging an edge region of the wheel assembly rim.

Figure 5A:
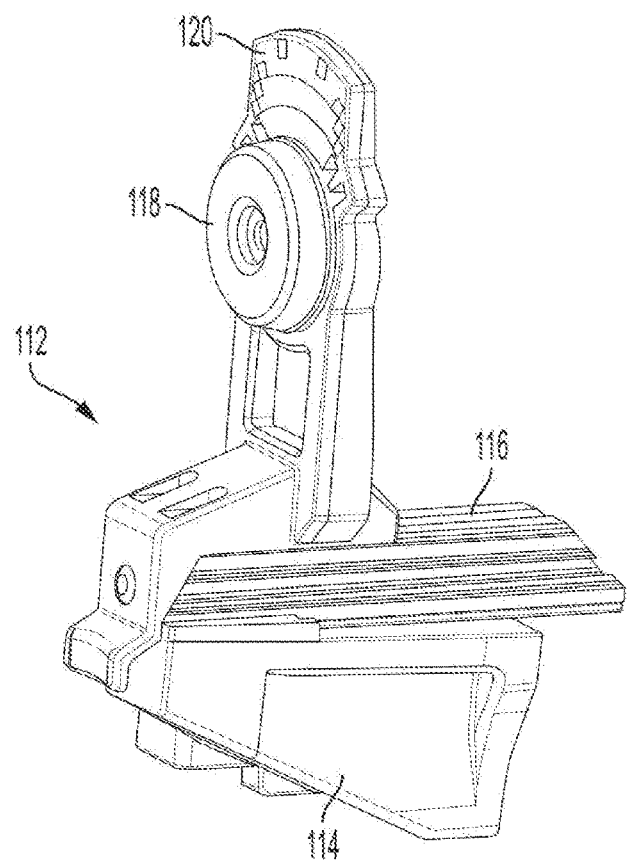
FIG. 5A is a perspective front view of an optical target support, removed from the front of the wheel adapter of FIG. 2, in a retracted configuration.
Figure 5B:
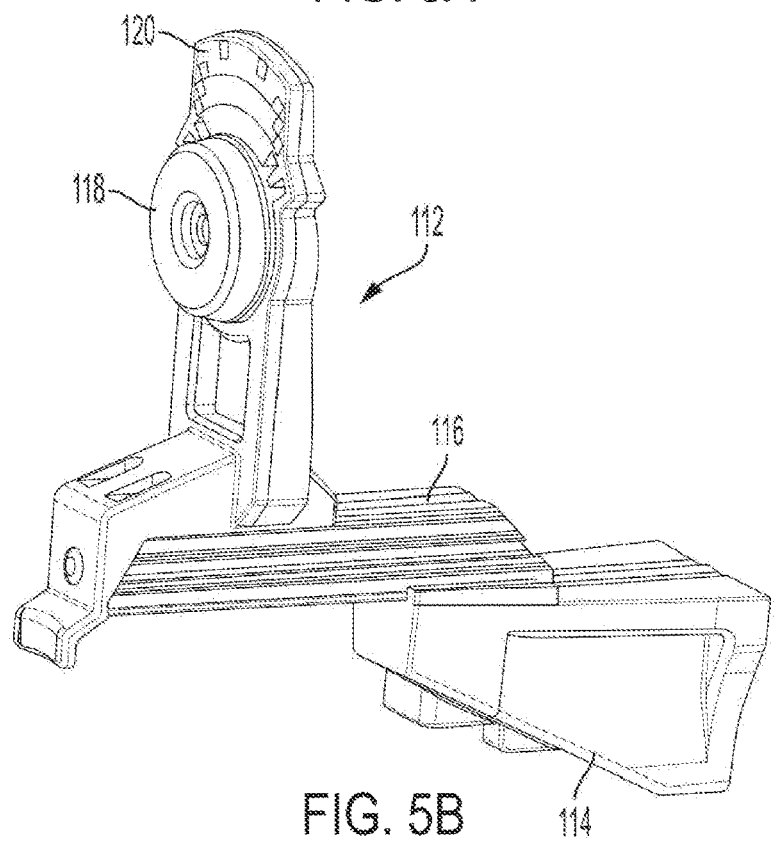
FIG. 5B is a perspective front view of the optical target support of FIG. 5A, in an extended configuration.

An axially adjustable target mount 112, shown in FIGS. 5A and 5B is secured to the base assembly 102 on the outboard side, axially opposite from the contact members 108, to receive an optical target 10 as seen in FIG. 1, an angle sensor (not shown) configured to acquire angular measurements, or other instrumentation such as a laser emitter (not shown). The axially adjustable target mount 112 comprises a fixed rail 114 projecting perpendicular to the outboard side of the base assembly 102, and a target coupling 116 having a bore 118 for receiving a stub shaft (not shown) of the optical target 10, angle sensor, or other instrumentation. The target coupling 116 is engaged with the fixed element 114, such as a rail, for sliding movement between axially outward retracted position (FIG. 5A) and an axially outward extended position (FIG. 5B). The target coupling 116 includes a plurality of marking indicia 120 denoting predetermined rotational positions about the bore 118 for rotational orientation of a coupled stub shaft and associated optical target, angle sensor, or other instrumentation. Optionally, the target coupling 116 may include a tab or clip to releasably engage the fixed element 114 with and hold the target coupling 116 at a selected position. Those of ordinary skill in the art will recognize that alternative mechanical arrangements for providing a displacement of the target coupling 116 between the axially outward retracted and extended positions are possible within the scope of the invention and need not be limited to sliding couplings. For example, a threaded rod mechanism may be utilized, as well as an arrangement of predetermined stationary attachment points for the target coupling 116.

Shifting the target coupling 116 axially outward from the retracted position shown in FIG. 5A to the extended position shown in FIG. 5B displaces a supported optical target 10, angle sensor, or other instrumentation away from the wheel assembly onto which the adapter assembly 100 is secured, as may be required to position the supported elements within an operative field of view of an observing instrument. For example, when a pair of adapter assemblies 100 are secured to longitudinally adjacent wheels of rear tandem axles on a heavy duty vehicle and observed from an imaging sensor located near the front of the vehicle, an optical target 10 secured to the forward adapter assembly may occlude an optical target 10 secured to the rear adapter assembly. Displacing the target couplings 116 lateral from each other by sliding the forward coupling to the retracted position (FIG. 5A), and concurrently sliding the rear coupling to the extended position (FIG. 5B) may provide sufficient line-of-sight clearance between the imaging sensor and the rearward optical target 10. Those of ordinary skill in the art will recognize that the amount of clearance provided by displacing a coupling axially outward from a base assembly 102 will depend upon the relative position of the observing imaging sensor, tandem axles, optical target sizes, and range of displacement from the wheel assemblies.

Figure 6:
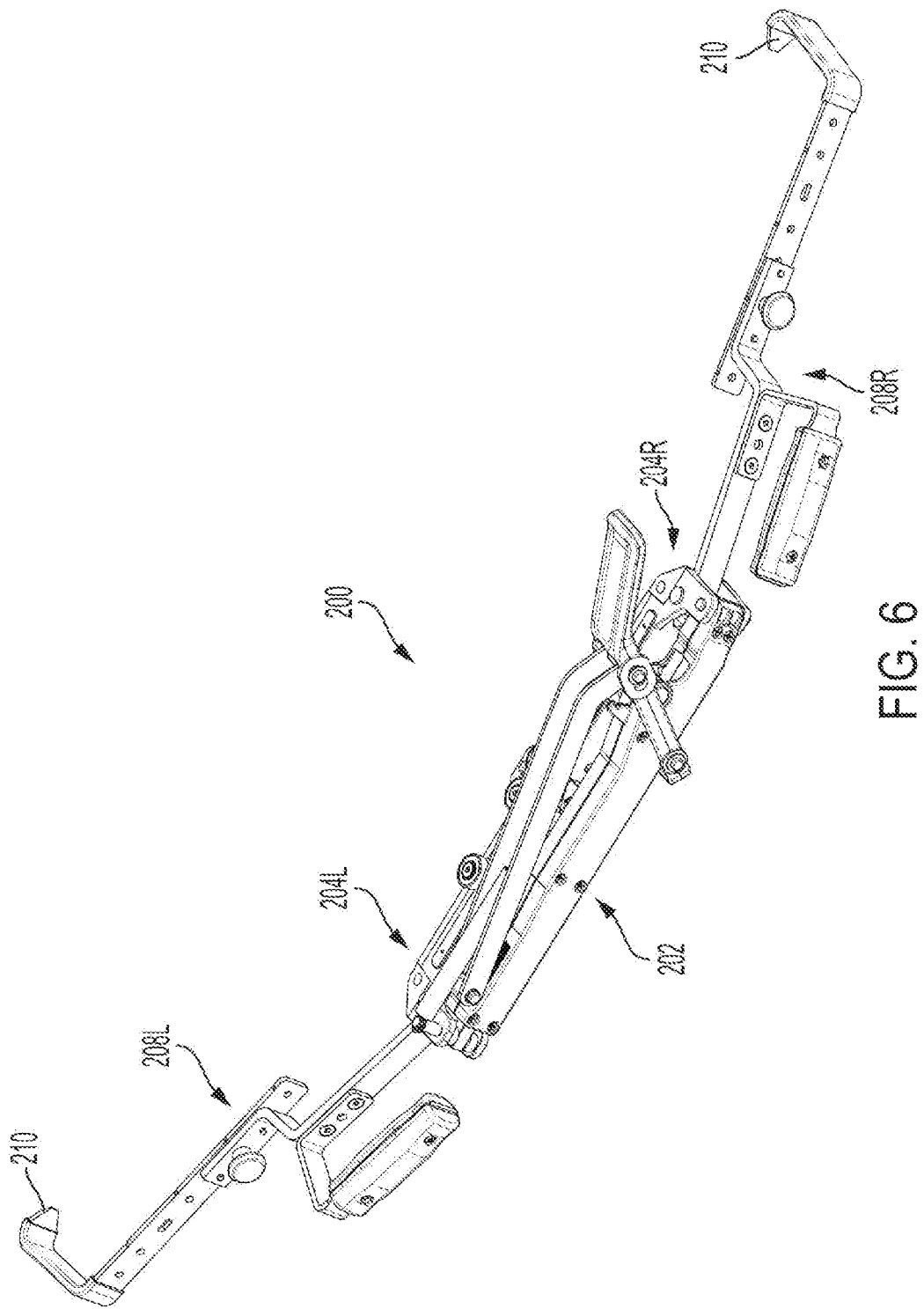
FIG. 6 is a perspective view of a clamp assembly and clamp arms for the wheel adapter, removed from the front of the wheel adapter of FIG. 2.
Figure 7:
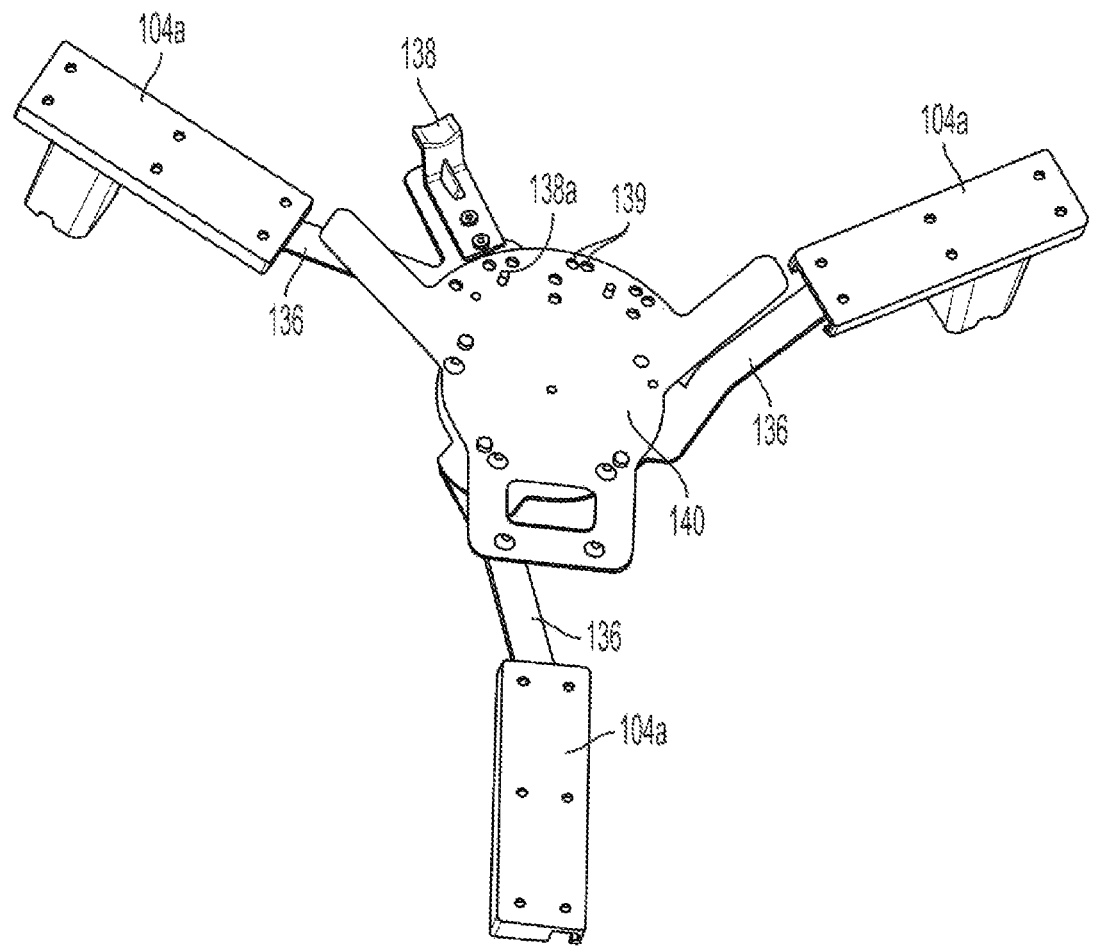
FIG. 7 is a front perspective view of a support framework for the wheel adapter contact surfaces, removed from the rear of the wheel adapter of FIG. 2.

To hold the adaptor assembly 100 to the wheel assembly, a clamp assembly 200, such as a spring-biased clamp assembly shown in FIG. 6, is coupled to the outboard surface of the base assembly 102. The clamp assembly 200 comprises a spring-biased compressible truss member 202 coupled between a pair of left and right connectors 204L, 204R seated within a transverse rail member 206 which in turn is secured to the base assembly 102. Extending radially outward from each connector 204L, 204R on opposite lateral sides of the clamp assembly 200, a pair of wheel clamp arms 208L and 208R are each configured with a terminal hook 210 to engage the tread surface of a tire with when the contact members 108 are in abutting placement against the a surface of the wheel assembly. The wheel clamp arms may either have a fixed length or may be longitudinally adjustable, such as by a sliding coupling or spaced attachment points. Similarly, the terminal hooks 210 may be rigidly coupled to the wheel clamp arms or may incorporate a pivoting and/or interchangeable connection. Operation of the clamp assembly 200 by compressing the spring-biased compressible truss member 202 draws the pair of connectors 204L, 204R towards each other within the transverse rail member 206, and applies a clamping load to the tire tread surface through the wheel clamp arms 208L and 208R, holding the contact members 108 against the wheel assembly. In one embodiment, the left and right connectors 204 are configured for a limited range of independent lateral movement within the transverse rail member 206 prior to application of the clamping load. Laterally moving one connector 204 independent of the other connector 204 facilitates engagement of an associated terminal hook 210 into the tire tread surface and can accommodate the terminal hooks 210 on opposite sides of the tire engaging different circumferential tread grooves. Additional accommodations for misalignment of the terminal hooks can be achieved by providing the transverse rail member 206 with a connection to the base assembly 102 capable of a limited range of pivoting about a vertical axis, rather than a rigid connection.

Those of ordinary skill in the art will recognize that the specific configuration of the clamp assembly 200, as well as the wheel clamp arms 208L and 208R may be varied from that which is described and shown in the accompanying figures. Any suitable mechanism capable of mechanical adjustment to engage the surfaces of a tire mounted to a wheel assembly upon which the adaptor assembly 100 is to be mounted, and which is capable of providing a releasable clamping and/or tensioning force, such as by means of a combination of springs, levers, and/or cams may be utilized without departing from the scope of the present disclosure.

During use, each contact member 108 on the support arts 104 of the base assembly 102 is abutted to the wheel assembly. Individual contact members 108 each comprise a removable support body 130 extending perpendicular to an associated support arm 104 from a base plate 132 and terminating at the inboard surface 110 for contact with the wheel assembly. Sets of contact members 108 having equal length support bodies 130 may be exchanged with other sets of contact members 108 having equal length support bodies of a different length to alter a standoff distance between the adapter assembly 100 and the wheel assembly onto which it is to be secured. In an alternative configuration, each contact member 108 is configured for independent sliding movement in the inboard/outboard direction and provided with a clamp mechanism 150 for locking the contact member 108 in a selected position. Any suitable clamping mechanism 150 may be utilized with the individual contact members 108, such as a releasable spring-biased tab 152 to engage spaced detents 154 in the body of the contact member 108, a friction-based clamp, a lock screw, or other locking elements. When configured with contact members 108 configured for independent sliding movement, each contact member is moved to the desired extension (or retraction) position and secured in place prior to abutting the base assembly 102 to the wheel assembly.

Figure 4A:
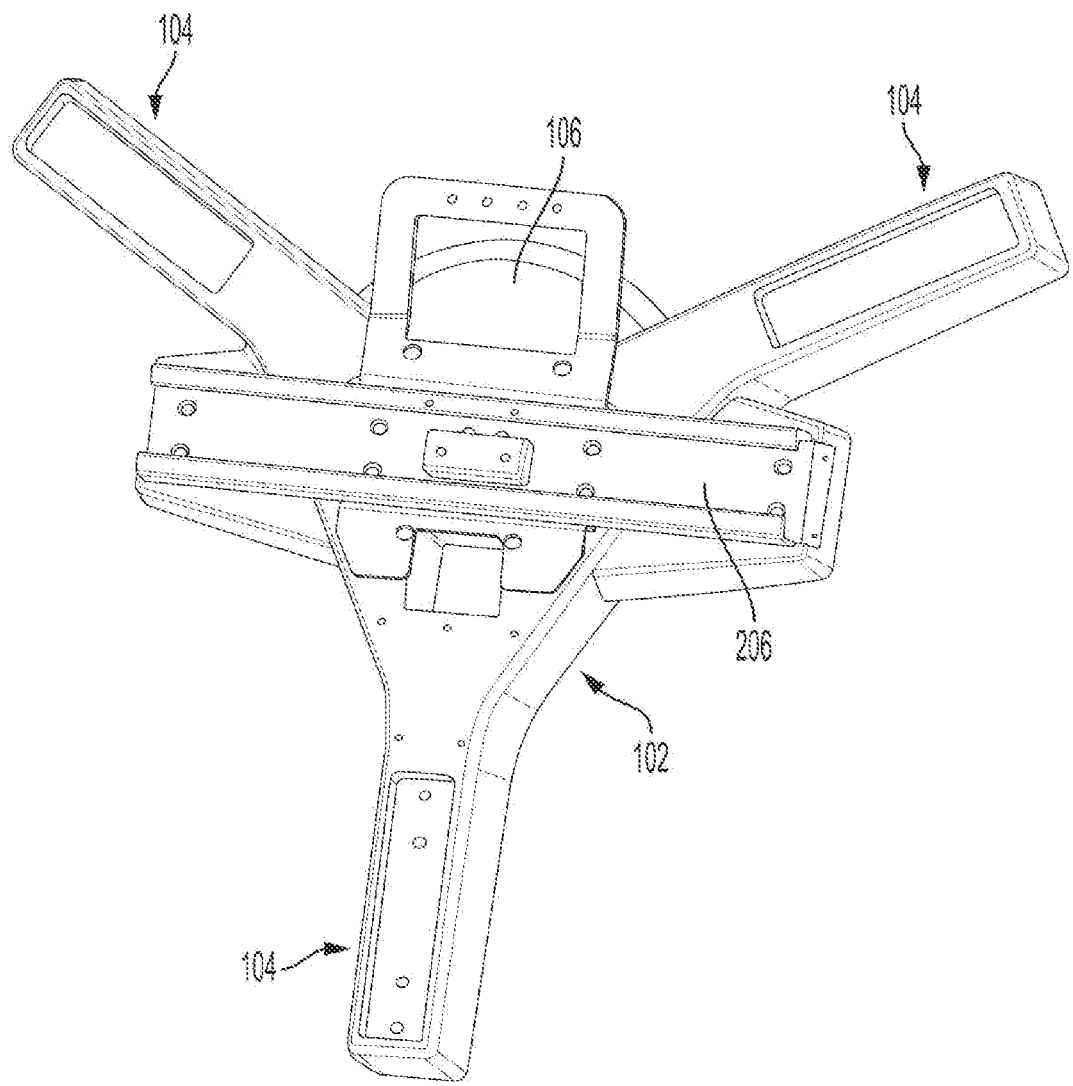
FIG. 4A is a front perspective view of the base structure for the wheel adapter of FIG. 2.
Figure 4B:
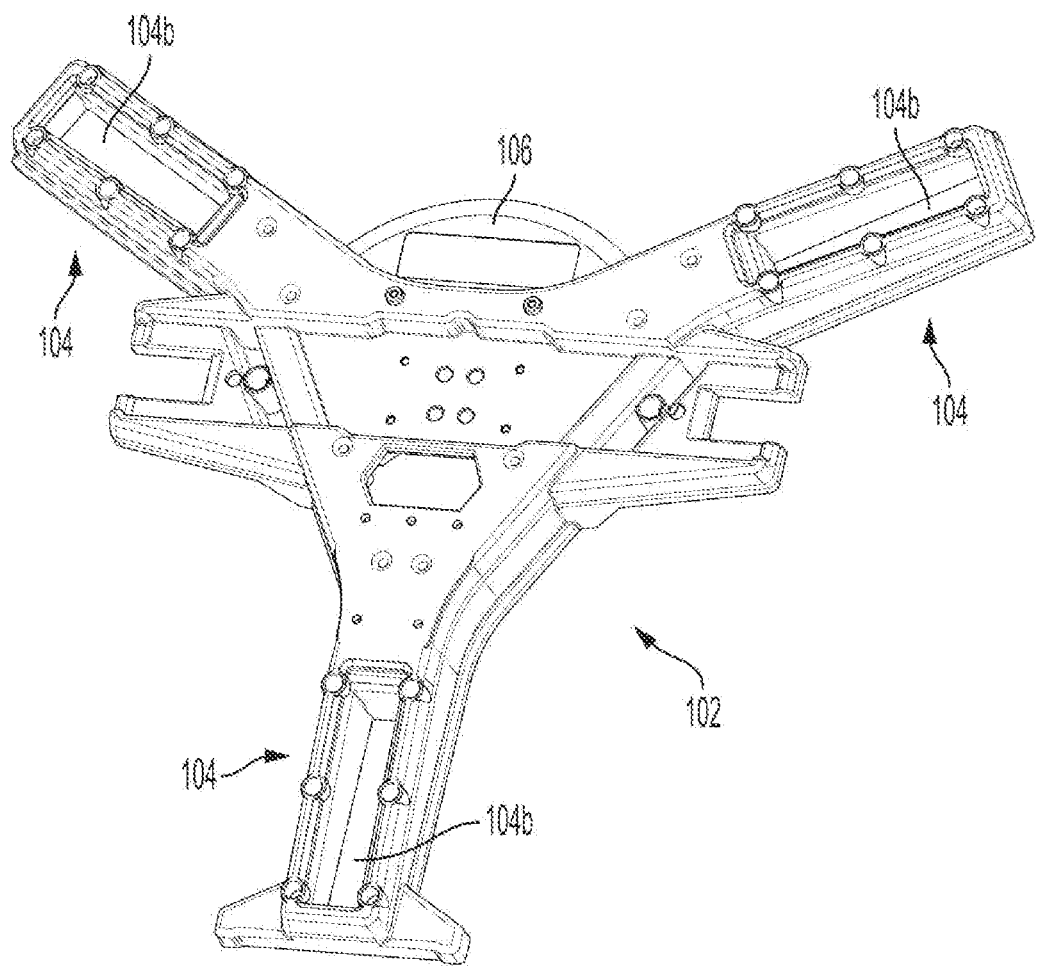
FIG. 4B is a front perspective view of an alternate embodiment of the base structure for the wheel adapter of FIG. 2.

To accommodate use on wheel assemblies having different diameters, each base plate 132 is seated within a channel 104a integrated into, or affixed on, the associated support arm 104 for sliding movement radial to an axis of the base assembly 102, between inner and outer positions as denoted by associated arrow S in FIG. 8. For embodiments incorporating contact members 108 configured for independent movement in the inboard and outboard directions, the base plate 132 and channel 104a may include appropriate pass-through openings 104b as seen in FIG. 4B to receive the contact members 108 and associated clamping mechanisms without departing from the scope of the present invention. An axially disposed position selector 134 is coupled to each base plate 132 via an associated radially offset linkage 136, such that rotation of the position selector 134 about an arc R imparts synchronous linear motion in a radial direction to each base plate 132. The arcuate range of movement R for the position selector 134 corresponds to the range of radial movement S available to the base plates 132 and support bodies 130. A lever arm 138 connected to the position selector 134 enables manual rotation of the position selector about the arcuate range R. The lever arm 138 includes one or more tabs 138a configured to releasably engage detents 139 in a fixed support plate 140 corresponding to predetermined radial engagement positions for the contact members 108. In one embodiment, each predetermined engagement position corresponds to the configuration of the contact members 108 required for placement against a wheel rim having a standard rim diameter, such as, but not limited to, 24.5", 22.5", 19.5", 19", and 17".

A method of the present invention for positioning an optical target 10 or other instrumentation against a wheel assembly requires placing an adaptor assembly 100 against an outboard surface of the wheel assembly. The adapter assembly 100 supports the optical target 10 or other instrumentation on an outboard side of a base assembly 102 and provides at least three discrete contact surfaces 110 adjustably located on an inboard side of the base assembly 102, a pair of wheel clamp arms 208L, 208R with tire hooks 210, and a clamp assembly 200 coupling the wheel clamp arms to the base assembly. A radial position of the contact surfaces 110 is synchronously adjusted relative to an axis of the adaptor assembly 100 to a diameter suited to engage a rim edge or concentric surface of the wheel assembly by arcuate rotation of an interconnected selection lever 138. Arcuate movement of the selection lever 138 rotates a central position selector 134 about an axis, altering a geometric relationship between base plates 132 supporting the contact surfaces 110 and the central position selector 134 via interconnecting linkages 136, and imparting a radial movement to the base plates 132. Once adjusted, each contact surface 110 is abutted against the rim edge or wheel assembly surface. The tire hooks 210 are hooked to a tread surface of wheel assembly and the clamp assembly 200 is operated to apply a clamping force across the pair of wheel clamp arms 208L, 208R, securing the adaptor assembly 100 against the wheel assembly.

In a further method of the present invention, a position of the supported optical target 10 on the adapter assembly 100 is altered along at least one axis parallel to an axis of the adapter assembly in order to place the optical target within an unobstructed field of view for an observing imaging system. A receiving portion of the coupling 116 securing the optical target to the base assembly 102 of the adapter assembly is linearly displaced between a first position adjacent to the base assembly 102, and a second position displaced axially outward from the first position. Optionally, the optical target 10 is rotated about the axis of the coupling to an operative orientation relative to the base.

It will be further recognized that the adaptor assembly 100 is not required to be placed coaxial with a rotational axis of the wheel assembly during use, but rather, may be secured in abutting placement against a rim surface of the wheel assembly, in a non-determined position and orientation relative to the wheel assembly rotational axis. A relationship between an optical target mounted to the coupling 116 and the axis of rotation for the wheel assembly can be determined during a suitable compensation procedure. As various changes could be made in the above constructions without departing from the scope of the disclosure, it is intended that all matter contained in the above description or shown in the accompanying drawings shall be interpreted as illustrative and not in a limiting sense.

The invention claimed is:

1. An adaptor assembly configured to secure an optical target relative to an outboard surface of a tire and rim wheel assembly, comprising:
    a base member having a set of support arms projecting radially outward from an axis of a central body, said base member defining an inboard surface oriented towards the wheel assembly during use, and an outer surface oriented away from the wheel assembly during use;
    a clamp assembly coupled to said outer surface of said base member, said clamp assembly including a pair of opposed wheel clamp arms laterally from a clamping mechanism and each terminating at a hooked outer end;
    a target mount, said target mount including a fixed element projecting outward from said outer surface of said base member together with a target coupling engaged with said fixed element for movement between at least a retracted position adjacent said outer surface of said base member and an extended position displaced outward from said outer surface;
    a contact member disposed on an inboard surface of each support arm, each contact member including a surface configured for abutting engagement with said wheel assembly; and
    wherein said target coupling includes a bore for receiving a target shaft, and wherein said target coupling further includes a plurality of marking indicia denoting predetermined rotational positions about said bore.

2. The adaptor assembly of claim 1 wherein said fixed element defines a rail projecting perpendicular to said outer surface of said base member; and
    wherein said target coupling is engaged with said rail for sliding movement between said retracted and extended positions.

3. The adaptor assembly of claim 1 wherein said clamp assembly is spring biased to exert a clamping force between said pair of opposed wheel clamp arms.

4. An adaptor assembly configured to secure an optical target relative to an outboard surface of a tire and rim wheel assembly, comprising:
    a base member having a set of support arms projecting radially outward from an axis of a central body, said base member defining an inboard surface oriented towards the wheel assembly during use, and an outer surface oriented away from the wheel assembly during use;
    a clamp assembly coupled to said outer surface of said base member, said clamp assembly including a pair of opposed wheel clamp arms laterally from a clamping mechanism and each terminating at a hooked outer end;
    a target mount, said target mount including a fixed element projecting outward from said outer surface of said base member together with a target coupling engaged with said fixed element for movement between at least a retracted position adjacent said outer surface of said base member and an extended position displaced outward from said outer surface;
    a contact member disposed on an inboard surface of each support arm, each contact member including a surface configured for abutting engagement with said wheel assembly;
    wherein each contact member comprises of a support body extending perpendicular to said associated support arm, each support body coupled to a base plate and having an outer end terminating at a contact surface; and
    wherein each base plate is coupled to said associated support arm for sliding movement radial to said axis of said central body, between an outer radial position and an inner radial position along said associated support arm.

5. The adapter assembly of claim 4 wherein each of said base plates is linked to a central hub for synchronous movement by an associated link arm pivotally coupled to said base plate and an associated radial tab of said central hub.

6. The adapter assembly of claim 5 wherein said central hub is coupled to said base member for rotation about a central axis perpendicular to said base member, said central hub including a locking mechanism for securing said central hub at one or more predetermined rotational orientations relative to said base member,
    whereby rotational movement of said central hub imparts a sliding movement to each of said base plates via said associated offset link arms, to synchronously alter a radial position of each contact member relative to said central axis.

7. The adapter assembly of claim 6 wherein said locking mechanism includes a releasable tab configured to engage one or more detents in said base member.

8. The adapter assembly of claim 4 wherein opposite longitudinal edges of each base plate seat within a pair of opposing channels on said associated support arm, whereby each base plate is retained against said base member and constrained to a limited range of sliding radial movement along said associated support arm by said opposing channels.

9. The adapter assembly of claim 4 wherein each support body of said contact members is coupled to said base plate by a sliding connection enabling inboard retraction and outboard extension sliding movement of said contact surface.

10. The adapter assembly of claim 9 wherein each of said sliding connections includes a clamp mechanism configured to secure said support body at one or more predetermined extended or retracted positions.

11. The adaptor assembly of claim 4 wherein said fixed element defines a rail projecting perpendicular to said outer surface of said base member; and
    wherein said target coupling is engaged with said rail for sliding movement between said retracted and extended positions.

12. The adaptor assembly of claim 4 wherein said clamp assembly is spring biased to exert a clamping force between said pair of opposed wheel clamp arms.

13. An adaptor assembly configured to secure an optical target relative to an outboard surface of a tire and rim wheel assembly, comprising:
- a base member defining a central body having an inboard surface oriented towards the wheel assembly during use, an outer surface oriented away from the wheel assembly during use, and an axis perpendicular to said inboard and outboard surfaces;
- a set of support arms projecting radially outward from said central body, perpendicular to said axis;
- a clamp assembly coupled to said outer surface of said central body, said clamp assembly including a pair of opposed wheel clamp arms extending laterally from a clamping mechanism and each terminating at a hooked outer end;
- a target mount on said outer surface of said central body;
- a contact member disposed on an inboard surface of each support arm, each contact member including a support body extending axially inboard from a base plate coupled to said associated support arm, and having a free end terminating at a contact surface; and
- an adjustment mechanism linking said base plates of each of said contact members for synchronous radial movement along said associated support arms, said adjustment mechanism including a position selector coupled to each base plate by a radially offset linkage, said position selector pivotally coupled to said central body for rotation between a plurality of engagement positions correspond to selected orientations, whereby rotation of said position selector drives said radial movement of said contact members via said associated radially offset linkages.

14. The adapter assembly of claim 13 wherein said target mount includes a rail projecting outward from said outer surface of said central body, said rail engaged with a target coupling for linear movement of said target coupling between at least a retracted position adjacent said outer face of said central body and an extended position displaced axially outward from said outer surface.

15. The adaptor assembly of claim 14 wherein said target coupling includes a bore for receiving a target shaft.

16. The adapter assembly of claim 15 wherein said target coupling includes a plurality of marking indicia denoting predetermined rotational positions about said bore.

17. The adapter assembly of claim 13, wherein said position selector includes a locking mechanism for securing said position selector at one or more predetermined rotational orientations relative to said central body.

* * * * *